United States Patent [19]

Nobilet et al.

[11] Patent Number: 4,768,448
[45] Date of Patent: Sep. 6, 1988

[54] METHOD AND PLANT FOR NEUTRALIZING ACID SMOKES ISSUED PARTICULARLY FROM THE COMBUSTION OF RESIDUES

[75] Inventors: Bernard Nobilet, Bouc Bel Air; Michel Bonhomme, Montpellier; Philippe Desplat, Eguilles, all of France

[73] Assignee: Propiorga, Puyricard, France

[21] Appl. No.: 96,018

[22] PCT Filed: Dec. 2, 1986

[86] PCT No.: PCT/FR86/00415
§ 371 Date: Jul. 28, 1987
§ 102(e) Date: Jul. 28, 1987

[87] PCT Pub. No.: WO87/03215
PCT Pub. Date: Jun. 4, 1987

[30] Foreign Application Priority Data

Dec. 2, 1985 [FR] France .............................. 85 17792

[51] Int. Cl.$^4$ .............................................. F23J 11/00
[52] U.S. Cl. ..................................... 110/346; 110/216; 110/345; 422/169
[58] Field of Search ............... 110/215, 216, 345, 346; 422/169, 171

[56] References Cited

U.S. PATENT DOCUMENTS 4,344,920 8/1982 Isserlis .............................. 110/215 X

FOREIGN PATENT DOCUMENTS

| 658619 | 2/1963 | Canada .............................. 110/215 |
| 0138781 | 4/1985 | European Pat. Off. . |
| 2802018 | 7/1979 | Fed. Rep. of Germany . |
| 3325140 | 1/1985 | Fed. Rep. of Germany . |
| 8703215 | 6/1987 | PCT Int'l Appl. . |

Primary Examiner—Edward G. Favors
Attorney, Agent, or Firm—Fisher, Christen & Sabol

[57] ABSTRACT

The invention relates to a process and an installation for neutralizing acid fumes coming in particular from the combustion of residues.

According to the invention, the combustion vapor and fumes laden with anhydrides and acids are neutralized after passage in the exchanger (19) by counter-flow encounter with a flow of a neutralizing liquid of basic pH constituted by a slurry formed on the one hand by water and on the other hand by the ashes coming from said combustion furnace and placed in suspension and-/or solution in said aqueous phase.

10 Claims, 2 Drawing Sheets

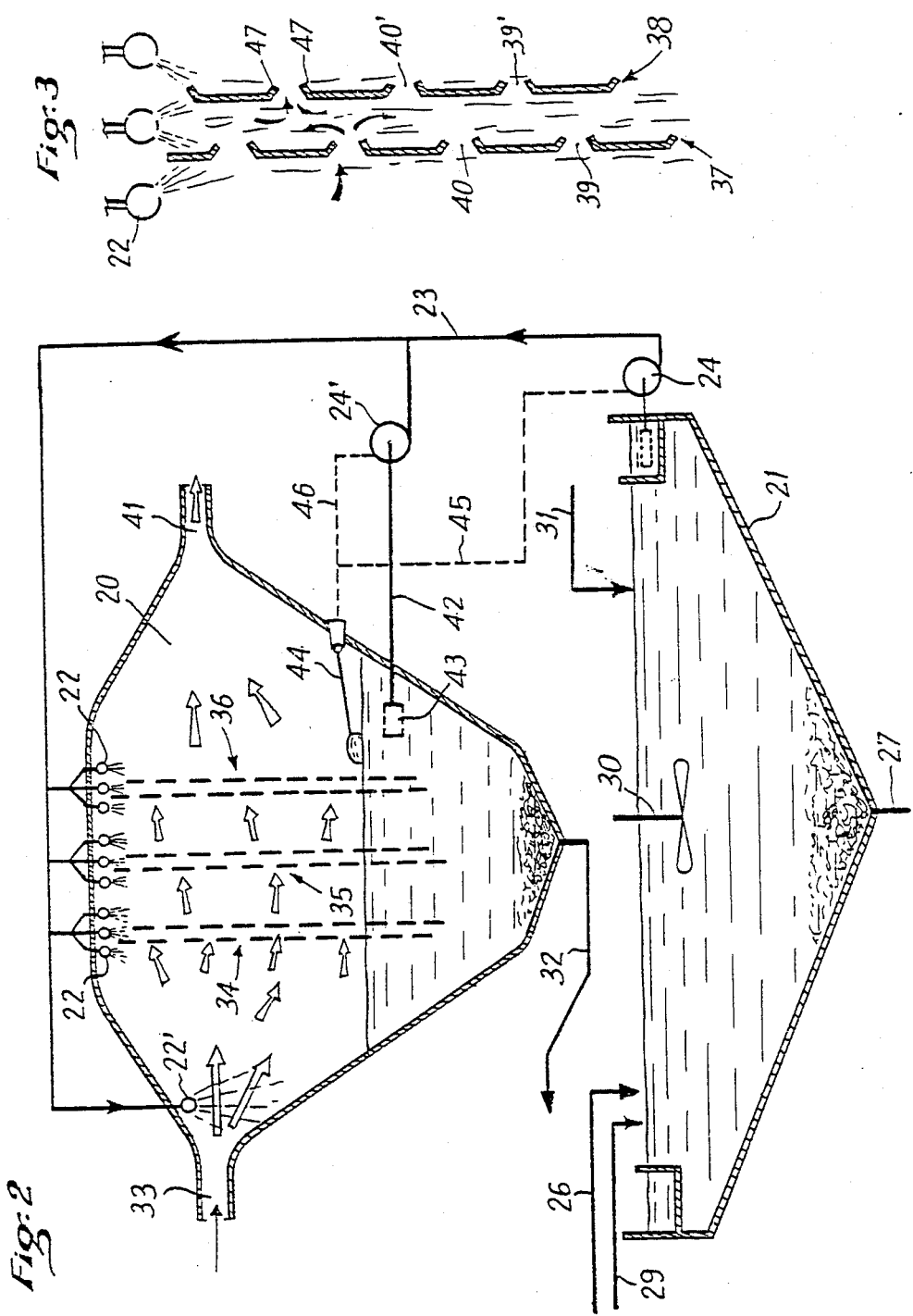

METHOD AND PLANT FOR NEUTRALIZING ACID SMOKES ISSUED PARTICULARLY FROM THE COMBUSTION OF RESIDUES

The present invention relates to a process and to an installation for carrying out this process, for the purpose of optimally recovering thermal energy from residues and waste.

The invention relates more especially to the treatment of residues and waste of agricultural or industrial origin as well as waste of urban origin such as household refuse.

The treatment of household refuse by incineration with a view to producing thermal energy, and of industrial or agricultural waste, is one of the ways allowing on the one hand energy saving and on the other hand the evacuation of polluting waste.

However, the treatment of waste by incineration raises numerous problems, particularly from the standpoint of ecology.

In fact, incineration ovens supplied with various waste, particularly in the case of household refuse, lead to burning by-products in bulk which are difficult to separate, such as products of synthetic origin; now, these latter deliver in the combustion gases an appreciable proportion of corrosive acid vapours.

These corrosive vapours cannot be rejected into the atmosphere and it is therefore necessary, in order to avoid this drawback, to provide either gas dilution or fume washing installations.

However, although these installations allow rejection into the atmosphere of fumes freed of an excessive percentage of noxious vapours, they produce acid water which must then be treated chemically before being able to be rejected into the environment.

And under these conditions, the installations proceeding by incineration of waste are limited economically due to the problems of pollution that they in turn raise and which must be solved.

The invention relates to an original process presenting the advantage of providing neutralization of the acid vapours escaping in the combustion gases, consequently allowing rejection of these gases into the atmosphere without creating as polluting by-products the presence of acids in liquid phase which would previously have to be chemically neutralized.

To that end, the invention relates in the first place to a process for the exploitation of residues or waste of industrial, agricultural or urban origin, with a view to exploiting the calorific power of these residues and proceeding by incineration thereof in a combustion furnace serving at least one heat exchanger for the production of thermal energy in the form of high-temperature heat-transfer fluid, and the process is characterized in that the combustion vapours and fumes laden with anhydrides and acids are neutralized after passage in the exchanger by the counter-flow encounter with a flow of a neutralizing liquid of basic pH constituted by a slurry formed on the one hand by water and on the other hand by the ashes coming from said combustion furnace and placed in suspension and/or solution in said aqueous phase.

According to one development of the invention, the fumes leaving the neutralization phase are subjected to condensation in order to eliminate the water vapour, the water coming from this condensation being recovered in order to constitute with the ashes the neutralization slurry.

According to another characteristic of the process, the residues constituting the starting raw material are subjected to an operation of granulometric separation, for example in a sieve drum with a view to eliminating the finest particles constituted mainly by organic matter, only the coarser elements forming the oversize and constituted by inert incombustible matter being used for supplying the incineration furnace.

And according to another characteristic, the phase of condensation of the purified fumes is provided with recycling of the hot water coming from condensation of the vapours below the dew point and this water is recycled in order to encounter, in counter-flow, the purified vapours, the hot water supplying before its recycling at least one low-temperature heat exchanger to which it transfers its calories.

The invention also relates to an installation for carrying out the process, this installation comprising an incineration furnace provided with a post-combustion chamber which serves a heat exchanger such as a tubular boiler in which the combustion gases allow the production of thermal energy conveyed by a heat-transfer fluid such as dry steam or superheated water, the heat exchanger being connected to a neutralization chamber at which arrive the combustion gases leaving the exchanger, said neutralization chamber comprising at its inlet at least one pipe for spraying a basic slurry, the purified fumes leaving the neutralization chamber arriving at a condenser constituted by a packed column supplied at its top with low-temperature trickling water taking the fumes to a temperature equal to or less than the dew point, causing condensation of the water vapour contained in the fumes, the trickling water reheated by heat exchange and increased by the condensation water, at a temperature slightly less than the dew point, being collected at the base of said packing column and being recycled at the top of the column after passage through at least one heat exchanger to which it transfers its calories, the installation further comprising a vat for mixing and forming the neutralization slurry supplied with condensation water of the purified fumes from the condenser formed by the packing column and the vat being supplied by a conveyer with combustion ashes from the incineration furnace, said vat being connected by a recycling circuit to the spray pipe located at the inlet and at the top of the neutralization chamber and comprising means for evacuating the solid residues decanted at the base of the vat.

Furthermore, the solid phase constituted by the finest particles having passed a step of sieving upstream of incineration is recovered in order to constitute an organo-mineral improvement or fertilizer by possible enrichment with mineral principles thanks to the incorporation of the ashes coming from combustion in the liquid phase constituted by the slurry for neutralizing the acid vapours in the neutralization chamber.

The installation preferably further comprises a mixer adapted to receive the finest particles having passed the sieving means located upstream of the incineration furnace and which are conveyed towards the mixer by conveying means from said sieve, the mixer also being connected by conveying means to the base of a vat containing the neutralization slurries and thus adapted to convey the solid extracts sedimented in said vat up to the mixer.

According to another characteristic, the installation assembly comprises programmable control means adapted automatically to control all the operational parameters of the installation, in particular, supply of the incineration furnace with combustible matter, supply of the combustion and post-combustion burner(s), supply and recycling of the basic slurry between the corresponding vat and the neutralization chamber, supply and recycling of the evaporator for condensation of the filtration liquors of the digestate, the circulators interposed on the fluid circuits, the motorizations of the means for conveying the solid and muddy phases.

Other characteristics and advantages of the invention will appear from the following description which is given in connection with a particular embodiment presented by way of non-limiting example and in the light of the accompanying drawings.

FIG. 2 shows a view in transverse section of the neutralization chamber.

FIG. 3 shows a view in detail of the baffle walls equipping the neutralization chamber.

Figure 1:
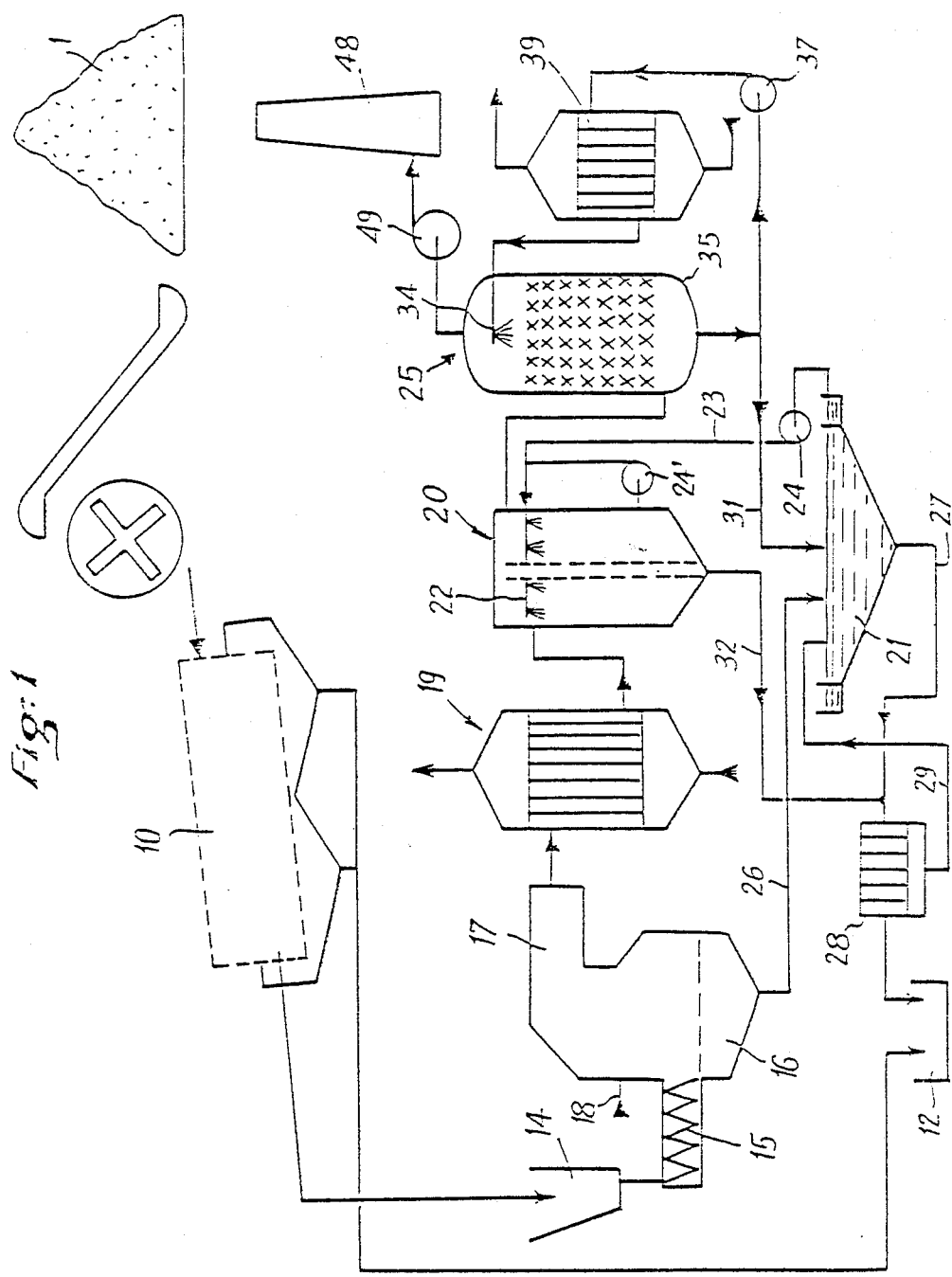
FIG. 1 shows a view of a general diagram of the incineration operations followed by neutralization of the combustion gases.

In all three Figures, the starting material used within the scope of the installation and the process according to the invention is constituted by residues of industrial or agricultural origin or of urban residues coming from the collection of household refuse.

These residues are placed in a heap 1 after having been subjected to an operation of removal of metals and scrap iron by known electro-magnetic means (not shown).

The raw material is taken from the heap 1 and (after possible treatment in a crusher) conveyed towards a sieving or separating assembly possibly constituted, as indicated by way of example in FIG. 1, by a first rotary sieve drum 10; that part intended to constitute the combustible subjected to incineration and constituting the oversize is conveyed towards the supply hopper 14 serving a supply conveyor 15, for example of the Archimedean screw type, or any other apparatus thus controlling supply of the incineration furnace 16.

Combustion in this furnace is controlled so as to respect temperature references at each step of their oxidation by the presence of burners and of devices for regulating the combustion-supporting air.

This furnace comprises a post-combustion chamber 17 and burners (not shown) supplied with fluid combustible (gas, fuel) from an independent outside source 18.

And the supply of this complementary combustible makes it possible to obtain perfect regularity in the operation of the assembly, compensating the variations in the calorific powers of the successive charges of the principal combustible.

The combustion gases leaving the post-combustion chamber 17 at a temperature of the order of 900° to 1000° C., pass in a first heat exchanger formed for example by a tubular boiler 19 producing at 18 a heat-transfer fluid at high temperature such as dry steam or superheated water or any other thermal fluid; this heat-transfer liquid is directed towards the possible uses such as a turbine for producing electrical energy or any conventional use.

The combustion gases leaving the exchanger 19 at a temperature of the order of 250° to 350° C. cannot be rejected into the atmosphere as they are considerably laden with anhydrides or acid vapours ($NO_2$, HCl and $SO_3$), these noxious products generally coming from the decomposition and combustion of plastics materials and generally from synthetic materials (in particular PVC).

It is therefore impossible to reject these fumes into the atmosphere; furthermore, it is desirable to recover the latent heat and the sensible heat contained in these fumes which, on leaving the boiler 19, are still at a high temperature.

The invention solves this problem with elegance by ensuring washing of the fumes and neutralization thereof at high temperature before these fumes are cooled to reach the dew point, beyond which the corrosive acids would be formed, which are aggressive for the metals constituting the enclosures of the installation.

To this end, the combustion gases are treated and neutralized in a neutralizing assembly formed by the neutralizing chamber 20 associated with a lower vat 21.

At the top of the neutralizing chamber 20 there are provided one or more pipes 22 spraying into the chamber containing the combustion gases in transit, a rain of a liquid constituting a neutralizing slurry of basic pH and coming from vat 21.

This slurry forms a bath in the lower part of the chamber 20 from which it is recycled by the recycling circuit 23 with pump 24'.

The basic neutralizing slurry which is permanently recycled receives extra liquid from the effluent 31 coming from the condensation tower 25 described hereinafter and supplying the vat 21 and with which are incorporated the ashes coming from the incineration furnace 16 conveyed from the conveying circuit 26.

A possibly intermittent mixer 30 ensures homogeneity of the assembly within the vat 21 whilst the particles sedimented to the base of the vat 21 are conveyed by conveyer 27 towards a filter press 28 or another system of separation from which the filtration liquid for example is recycled at 29. This filter press 28 also receives via circuit 32 the sludge sedimented to the base of the neutralizing chamber 20.

The combustible supplying the incineration furnace generally includes an appreciable percentage of residues (paper, packing, cardboard) comprising a high proportion of inorganic charges leading to a percentage of ashes of the order of 10 to 16%; these inorganic ashes are formed by salts containing a considerable proportion of calcium and potassium oxides and are therefore strongly basic. These ashes are poured into the liquid phase of the vat 21 where they are placed in suspension or (totally or partially) in solution to constitute a slurry with strongly basic pH which may be taken, for example, from a peripheral chute or any other system by the circuit 23 arriving at the spray pipe 22.

Within the chamber, the liquid phase formed by the basic slurry described hereinabove encounters the acid vapours which are neutralized by leading to the formation of generally insoluble salts which sediment in the bottom of the chamber 20 to arrive for example via the evacuation circuit 32 and at the filter press 28.

FIG. 2 gives a detailed view of the constitution of the neutralizing chamber 20.

The fumes laden with acid vapours arrive through the supply opening 33 and spread in the whole of the enclosure constituted by the chamber 20.

However, from the supply opening 33, the vapours pass through a first curtain of neutralizing slurry poured from pipe 22'.

This pipe is positioned at the opening of pipe 33 and it allows a first precipitation of the insoluble salts which are formed rapidly being given the thermal shock to which are subjected the vapours which arrive at a temperature of between 200° and 300° and which then encounter a curtain of rain at a temperature close to ambient temperature.

The fumes then traverse the chamber 20 in an eddying path provoked by the presence of the baffle devices 34, 35, 36.

Each of these devices is itself constituted by two walls 37, 38 (FIG. 3), these walls being provided with openings 39, 40, 39', 40' which are disposed in quincunx from one wall to the other.

It is seen that, under these conditions, the gaseous streams which have passed through an opening 39, 40 of one wall 37 arrive in the interstitial space between the two walls 37 and 38 without encountering there opposite a corresponding opening.

The gaseous streams are therefore deviated and led to follow a path generating eddies (as shown in FIG. 3) before flowing through the second set of openings 39', 40' disposed in the second wall 38; the edges of the openings comprise a slightly incurved shoulder or return 47, 47'.

After having passed a first baffle device 34, the fumes must pass a second 35 and a third 36, successively.

And these baffle devices 34, 35, 36 are permanently sprayed from the pipes 22, with the result that the streams of the fumes passing through the baffle devices pass in fact through a curtain of rain and permanently sweep the walls 37, 38 which comprise a thin layer film of the liquid phase poured from the pipes 22 and constituted by the basic neutralizing slurry.

In this way, a system is obtained in which the interface between the two gaseous and liquid phases represents an extremely large surface, faciliting exchanges and reactions between the two phases, the acid vapours contained in the gaseous phase being called upon to combine with the basic principles contained in the neutralizing slurry.

And under these conditions, the vapours and fumes which arrive in the right hand part of the neutralizing chamber, when they escape through conduit 41, are virtually bereft of any acidity.

The neutralizing slurry is accumulated in the lower part of chamber 20 where it constitutes a bath from which it is removed via conduit 42 with strainer 43 and recycled by pump 24' towards the supply circuit 23 itself supplied by pump 24 from the lower vat 21.

Supply of chamber 20 with neutralizing slurry may consequently be regulated from pumps 24, 24' whose operation may itself be modulated from the level probe 44 by the servo-control circuits 45, 46.

However, within the scope of a programmation and centralized control, it may also be provided that the data recorded by the level probe 44 are sent to a central unit adapted to initiate orders as a function of all the data received, this concerning both the recycling and supply of the neutralizing chamber and the other elements composing the assembly line.

The purified gases emerging from the neutralizing chamber 20 and strongly laden with water vapour may then be subjected to an operation of condensation in the condensation chamber or condenser 25 where they encounter in counter-flow trickling water coming from the upper spray(s) 34.

The water coming from the spray(s) 34 flows over a known packing such as a packing of the Raschig ring type 35 which may advantageously be of the type described in French Pat. Nos. 79 30419 and 81 13369.

The trickling water, enriched with the condensation water coming from the purified gases, is evacuated at the base of column 25 towards the vat 21 whilst the major part is conveyed from circulator 37 towards a low-temperature heat exchanger 39.

The purified fumes emerge from the top of the tower 25 having lost substantially all their calories and may be forced by circulator 49 towards the stack 48 for rejection into the atmosphere.

We claim:

1. A process for exploiting residues or waste of industrial, agricultural or urban origin, for the purpose of recovering the calorific power of these residues, process comprising the following steps of:
    (a) proceeding by the incineration of said residues or waste in a continuously supplied combustion furnace;
    (b) recovering the combustion ashes which are directed towards a vat also supplied with water so as to form a slurry of basic pH by mixture of the water and the ashes;
    (c) evacuating the high temperature combustion gases and directing them towards a heat recuperator, the combustion gases being maintained above the dew point until they leave said recuperator, thus avoiding the acidic vapors contained in said bases being harmful to said heat recuperator,
    (d) introducing the combustion gases leaving the recuperator, still at a temperature higher than said dew point, into a neutralizing chamber where the gases encounter a flow of the neutralizing liquid constituted by the basic slurry coming from said vat and obtained by mixing a basis of water and combustion ashes thus placed in suspension or solution in said aqueous phase; and
    (e) evacuating the combustion gases into the atmosphere, the acid vapors or anhydrides with which these vapors were laden having been neutralized, the liquid and solid residues constituted by the slurry leaving the neutralizing vat also being neutralized and capable of being recovered to form a fertilizer containing mineral salts.

2. The process of claim 1 wherein the fumes leaving the phase of neutraliziation are subjected to condensation to eliminate the water vapor, the water coming from this condensation being recovered to constitute with the ashes the neutralizing slurry.

3. The process of claim 2 wherein the phase of condensation of the purified fumes is provided with recycling of the hot water coming from the condensation of the vapors below the dew point and this water is recycled to encounter the purified vapors in counter-flow, the hot water before recycling supplying at least one low-temperature heat exchager (39) to which it transfers its calories.

4. An installation for carrying out the process of claim 1 which comprises:
    (a) an incineration furnace (16);
    (b) a heat recuperator (19) such as a tubular boiler in which the combustion gases coming from the furnace allow production of thermal energy conveyed by a heat-transfer fluid such as dry steam or superheated water;
    (c) a neutralizing chamber receiving the combustion gases coming from the heat recuperator;

(d) at least one spray pipe (22) located in said chamber;

(e) a vat (21) for mixing and forming the neutralizing slurry supplied on the one hand with water and on the other hand with combustion ashes from the incineration furnace (16), said vat (21) being connected by a recycling circuit (23) to the spray pipe (22) located in the neutralizing chamber;

(f) conveying means connecting the incineration furance 16 to said vat for conveying the ashes; and (g) means (27) for evacuating the solid residues decanted at the base of the vat.

5. The installation of claim 4 wherein the installation comprises a condenser supplied by the purified fumes leaving the neutralizing chamber and laden with humidity, these fumes arriving at the condenser constituted by a packed column (25) supplied at its top with low-temperature trickling water taking the fumes to a temperature equal to or less than the dew point causing condensation of the water vapor contained in the fumes, the trickling water reheated by heat exchange and increased by the condensation water, at a temperature slightly less than the dew point, being collected at the base of said packed column and being recycled at the top of the column (25) after passage through at least a second heat exchanger (39) to which it transfers its calories, part of said water collected at the base of the column being directed towards the vt (21).

6. The installation of claim 4 wherein the installation further comprises a mixer (12) adapted to receive the finest particles having passed the sieving means (10) located upstream of the incineration furnace and which are conveyed towards the mixer by conveying means from said sieve, the mixer also being connected by conveying means (27, 32) to the base of the vat (21) and to the base of chamber (20) and thus adapted to convey the solid exctracts sedimented in said vat (21) and chamber (20) up to the mixer in order to obtain an organo-mineral improvement.

7. The installation of claim 4 wherein the neutralizing chamber (20) comprises a first pipe (22') pouring a neutralizing slurry obtained by suspending ashes in an aqueous phase, this pipe being located at the opening of the conduit (33) through which the fumes penetrate into said chamber.

8. The installation of claim 4 wherein the neutralizating chamber (20) comprises a baffle device (34, 35, 36) formed by walls (37, 38) of which the openings (40, 40') allowing passage of the fumes are offset from one wall to the other, obliging the fumes to follow a complex eddying path.

9. The installation of claim 8 wherein the baffle devices are formed by metal plates (37, 38) made of stainless steel and of which the openings (39, 39', 40, 40') non-concordant from one wall to the other comprise on their edges an incurved return (47, 47').

10. The installation of claim 8 wherein the walls forming baffle are sprayed by second pipes (22) pouring over said walls and in the interstitial space between the walls, a plurality of curtains of rain formed by said basic neutralizing slurry.

* * * * *